UNITED STATES PATENT OFFICE.

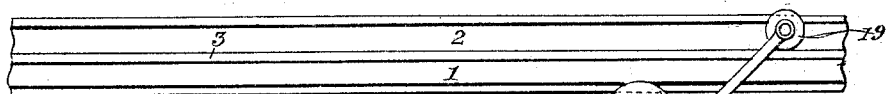
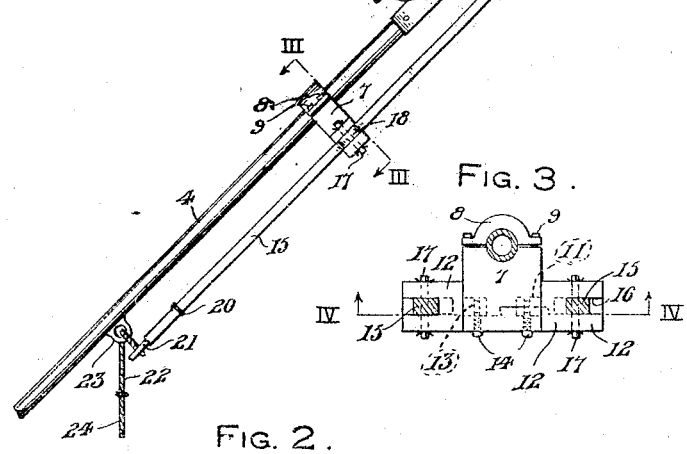
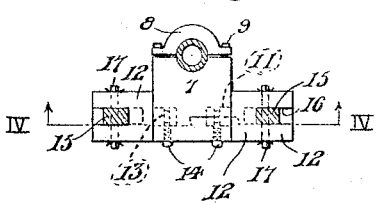
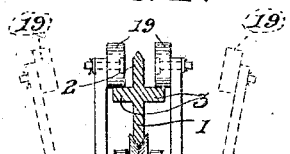
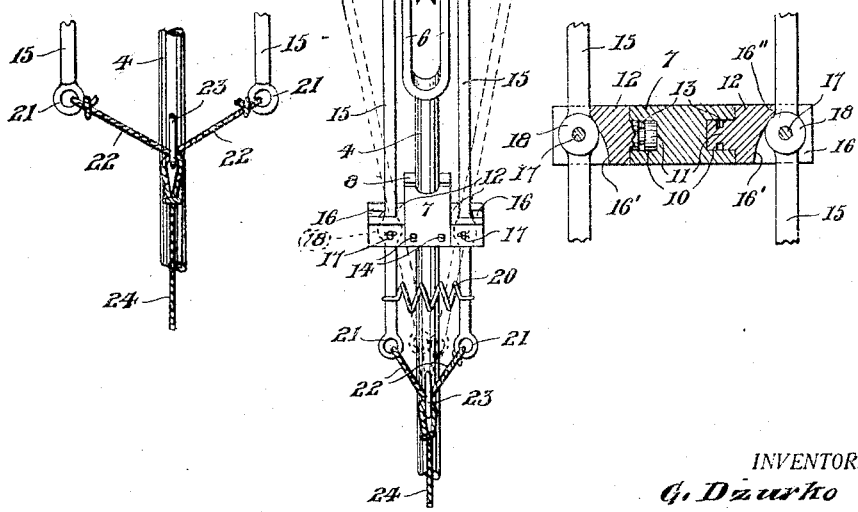

GEORGE DZURKO, OF PLEASANT CITY, OHIO.

TROLLEY-WHEEL GUARD.

1,364,258.  Specification of Letters Patent.  Patented Jan. 4, 1921.

Application filed October 25, 1920. Serial No. 419,437.

*To all whom it may concern:*

Be it known that I, GEORGE DZURKO, citizen of the United States of America, residing at Pleasant City, in the county of Guernsey and State of Ohio, have invented certain new and useful Improvements in Trolley-Wheel Guards, of which the following is a specification.

This invention relates to certain new and useful improvements in trolley wheel guards and has for one of its objects to provide a guard attachment for the upper end of a trolley pole adapted to overlie a particular type of trolley conductor for retaining the trolley wheel in engagement with the conductor.

A further object of the invention is to provide a trolley guard attachment for trolley wheels wherein the guard is capable of slight movements during the operative engagement thereof with the trolley conductor to accommodate the guard to uneven tracking engagement with the conductor.

With the above and other objects in view, the present invention consists in the novel form, combination and arrangement of parts hereinafter more fully described in connection with the accompanying drawings and in which like reference characters indicate similar parts throughout the several views.

In the drawings,

Figure 1 is a side elevational view of the upper end of a trolley pole having the improved guard attached thereto and operatively associated with a trolley conductor, Fig. 2 is a front elevational view of the upper end of the trolley pole with the trolley conductor shown in section and with the guard arms shown by dotted lines in inoperative positions, Fig. 3 is a cross sectional view taken on line III—III of Fig. 1 showing the guard attachment for the trolley pole, Fig. 4 is a cross sectional view taken on line IV—IV of Fig. 3 showing the swivel connection between the guard arms and the block mounting therefor, and Fig. 5 is a fragmentary detail view showing the rope connection between the inner ends of the guard arms for shifting the same relative to the trolley conductor.

Referring more in detail to the accompanying drawings and particularly to Figs. 1 and 2, there is illustrated an improved form of trolley wire conductor, the same being cross-shaped in cross section and embodying inner and outer sections 1 and 2 having intermediate oppositely extending side flanges 3. The trolley pole is of usual construction embodying an arm 4 having a trolley wheel 5 journaled in the outer end thereof by means of the U-shaped bracket 6.

The guard attachment for maintaining the trolley wheel in tracking engagement with the conductor 1 embodies a block 7 having a concaved side in one face thereof for receiving the trolley pole 4 that is held rigid therein by the overlying strap 8 secured to the block by attaching members 9. As shown in Figs. 3 and 4, the opposite sides of the block 7 are provided with sockets 10 within which bearings 11 of the guard arm supports 12 are received, the bearings 11 having annular grooves 13 lying within the sockets 10 and into which grooves the inner ends of the retaining screws 14 are loosely received to permit rotary movement of the bearings 11 within the block sockets.

A guard arm 15 is pivotally mounted intermediate its ends in the outer ends of the arm supports 12, the outer ends of the supports being bifurcated to provide side arms 16 through which bearing pins 17 extend for pivotally supporting the arms at the points 18. As shown in Fig. 4, the inner wall of the slots between the arms 16 is inclined inwardly as at 16′ to provide for pivotal movement of the arms 15 while the outer ends of the inner walls of the slot form abutments as 16″ for engaging the arms 15 outwardly of the pins 17 to limit the closing movement of the outer ends of the arms. The outer ends of the arms 15 carry rollers 19 engaging the outer faces of the conductor flanges 3 for coöperation with the trolley wheel 5 in maintaining the trolley wheel in proper engagement with the conductor 1, and to maintain the rollers 19 in this position, an expansion spring 20 extends between the inner ends of the arms 15 as shown in Fig. 2, normally to hold the inner ends of the arm separated. A ring 21 is formed on the inner end of each arm 15 and has a rope connection 22 extending through an apertured lug 23 carried by the trolley pole 4 while the inner ends of the separate ropes 22 merge into the single rope 24 extending to a point in proximity of the car for shifting the guard arms 15 and also for purposes of positioning the trolley wheel 5 for engagement with the conductor 1.

In positioning the trolley wheel 5 upon the conductor 1, the pole 4 is detached from the usual form of hook carried by a car roof to permit upward movement of the harp end of the pole and a strain upon the rope 24 will maintain the arms 15 separated at their outer ends as shown in Fig. 2. When the trolley wheel 5 has been positioned upon the lower flange 1 of the trolley conductor, tension upon the rope 24 is relieved to permit the spring 20 to expand and move the outer ends of the arms 15 in directions toward each other with the rollers 19 overlying the flanges 3 of the trolley conductor as shown in Fig. 2 with the trolley wheel securely positioned in engagement with the conductor. The swivel connection between the guard arm supports 12 and the mounting block 7 permits slight movement of the arms to accommodate unevenness in the travel of the trolley pole while the pivot pins 17 will also permit slight lateral movements of the arms 15 to accommodate the guard arms to obstructions on the conductor 1.

While there is herein shown and described the preferred embodiment of the invention, it is nevertheless to be understood that minor changes may be made in the form, combination and arrangement of parts without departing from the spirit and scope of the invention as claimed.

What is claimed as new is:

1. A trolley wheel guard comprising a trolley pole having a trolley wheel at the upper end thereof, a block secured to said pole, opposite supports swivelly connected to said block, guard arms pivotally mounted in said supports, guard rollers carried by the outer end of said arm adapted to be positioned in overlying relations to the trolley wheel and an expanding spring extending between the inner ends of the guard arms.

2. A trolley wheel guard comprising a trolley pole, a wheel journaled in the upper end thereof, a block secured to said pole, a guard arm support swivelly connected to the opposite sides of said block, the outer ends of the supports being bifurcated to provide an intervening slot having the rear wall of the slot inclined inwardly, a guard arm pivotally mounted in the support slots and limited in its movements by the inclined inner wall thereof, guard rollers carried by the outer ends of said arms and an operating rope for the guard arms secured to the lower ends thereof.

In testimony whereof I affix my signature.

GEORGE DZURKO.